(12) United States Patent
Lieftink et al.

(10) Patent No.: US 11,306,921 B2
(45) Date of Patent: Apr. 19, 2022

(54) PORTABLE THERMAL CONVECTION ROTISSERIE AND BARBEQUE APPARATUS FOR USE IN A VARIETY OF SETTINGS

(71) Applicants: Engelbart Lieftink, Deerfield Beach, FL (US); Lisa Ferrier, Deerfield Beach, FL (US)

(72) Inventors: Engelbart Lieftink, Deerfield Beach, FL (US); Lisa Ferrier, Deerfield Beach, FL (US)

( * ) Notice: Subject to any disclaimer, the term of this patent is extended or adjusted under 35 U.S.C. 154(b) by 0 days.

(21) Appl. No.: 15/676,112

(22) Filed: Aug. 14, 2017

(65) Prior Publication Data

US 2021/0325047 A1 Oct. 21, 2021

(51) Int. Cl.
| | |
|---|---|
| *F24B 7/04* | (2006.01) |
| *A47J 37/04* | (2006.01) |
| *A47J 37/07* | (2006.01) |
| *F24B 13/00* | (2006.01) |
| *F24B 15/04* | (2006.01) |

(52) U.S. Cl.
CPC ............. *F24B 7/045* (2013.01); *A47J 37/043* (2013.01); *A47J 37/0754* (2013.01); *F24B 13/004* (2013.01); *F24B 15/04* (2013.01)

(58) Field of Classification Search
CPC ........ F24B 7/045; F24B 13/004; F24B 15/04; A47J 37/043; A47J 37/0754; A47J 37/04; A47J 33/00; A47J 36/26; F24C 15/16; F24C 15/164

USPC ........ 99/421 R, 419, 421 HV, 421 M, 421 V
See application file for complete search history.

(56) References Cited

U.S. PATENT DOCUMENTS

| | | | | |
|---|---|---|---|---|
| 366,088 | A * | 7/1887 | Fowler | |
| 1,719,713 | A * | 7/1929 | Miller | A47J 37/043 99/346 |
| 2,517,360 | A * | 8/1950 | Singer | A47J 37/043 99/421 R |
| 2,549,019 | A * | 4/1951 | Saunders | A47J 37/043 99/421 P |
| 3,448,679 | A * | 6/1969 | Carl | A47J 37/0718 99/443 R |
| 3,817,164 | A * | 6/1974 | Hintze | A47J 37/043 99/421 V |

* cited by examiner

*Primary Examiner* — Justin M Jonaitis
(74) *Attorney, Agent, or Firm* — Kevin P. Crosby; Rubin & Rubin

(57) ABSTRACT

A portable temperature regulated rotisserie and barbequing apparatus including a substantially cylindrically-shaped housing comprised of a stainless steel and further including a set of carrying handles. The hollow cylindrically shaped housing includes a latching mechanism to releasably secure the planar drip pan at the second end and a centrifugal fan including a plurality of concave blades which increase the volume and air speed to the blades. The spit releasably attached the centrifugal fan and rests on the shaft anchor.

17 Claims, 4 Drawing Sheets

PORTABLE THERMAL CONVECTION ROTISSERIE AND BARBEQUE APPARATUS FOR USE IN A VARIETY OF SETTINGS

FIELD

The embodiments presented provide a portable temperature regulated rotisserie and barbeque apparatus, and in particular, to a portable thermal convection rotisserie and barbeque apparatus which regulates temperature and air flow using an integrated free-spinning fan to provide an optimal and consistent temperature within the housing.

BACKGROUND

Rotisserie cooking devices, smokers, roasters, barbeques and various types thereof are all known in the art. A rotisserie is a device that causes food to pass over a heating element slowly and repeatedly by utilizing rotation. Rotisserie cooking typically requires a main cooker body, a heat source, a rotisserie spit comprised of a rod that extends the length of the cooker and is designed to skewer and hold the food to be cooked, and a means for rotating the spit so that the food, when placed on the spit and inside the cooker body, passes over the heat source at a rate that allows for uniform cooking.

There is a growing trend in the art for creating portable cooking devices that utilize a natural heat source such as coal, wood, or similar fuels and which does not require several devices, attachments, or additional power sources to cook various foods in outdoor living spaces and mobile outdoor gatherings such as "tailgates." Standard barbeques and other portable cooking devices do not require an additional power source and are often made to be at least minimally portable by using collapsible bases, wheels, and locking mechanisms for transport. Some of these standard barbeques and other portable cooking devices further incorporate means for cooking or preparing the meat with a smoker. Additionally, some of these standard barbeques and other portable cooking devices further incorporate or allow for the addition of a rotisserie device to rotate a spit holding meat over the existing heating source.

Smokers have been introduced as both standalone systems or add-on devices in order to cook and prepare meat with a smoking process. The process of smoking meat requires cooking at a substantially lower temperature over a longer period of time than many other cooking methods utilize. Moreover, because most smokers do not incorporate the rotation involved in a rotisserie, they typically require a certain distance be maintained from the heat source and smoking to prevent overexposure to either element and ensure even cooking and smoking.

Rotisserie devices have been introduced as both standalone systems and add-on devices, either of which operates by requiring motors that typically use an electric power source or relying on manual human input. Because most rotisserie devices that independently rotate the spit require electrically powered motors, they are often permanently affixed to the cooking space where it is used, or they are limited to use only where there is a readily accessible electrical power source. Further, the additional components and accessories required for rotisseries with electrically powered motors reduce portability and increase the risk of malfunction. Rotisseries that utilize manual human input to maintain the rotation of the spit and food require the human input to remain measured and consistent during the long period of time necessary for rotisserie cooking.

Though there are rotisserie or barbeque system known in the art such as U.S. Pat. No. 5,497,697 to Promny; U.S. Pat. No. 5,355,778 to Mayfield; and U.S. Pat. No. 3,215,338 to Schirmer; there is no single reference which discloses the features of the embodiments provided.

SUMMARY OF THE INVENTION

The embodiments provided describe a portable thermal convection rotisserie and barbequing apparatus which includes a housing containing a free-standing spit shaft with a releasably attached centrifugal fan blade which rotates the food mounted on the spit shaft and spit shaft forks by regulating the air flow within the hollow housing. The removable spit shaft includes a tungsten steel tip which is seated within an anchor of a planar drip pan. The apparatus further includes a planar drip pan at the bottom end which may be attached and detached using a latching mechanism and a fuel basket seated within a recessed portion of the housing and may be removed by shifting the securing latches between the open and closed position and pulling on the attached grip of the heat shield portion. The charcoal plate located at the back side of the housing further includes a rectangular shaped heat shield anchored to a charcoal plate to prevent burns to the user when placing or removing hot charcoals.

The apparatus includes a wood pellet basket located inside the housing at the front end which allows the user to insert soaked or dry wood chips to create a smoky flavor. When using the apparatus for barbequing, the user may simply add a fuel source within the fuel basket and regulate the air flow using the set of vent panels located on the front end of the apparatus.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

There is shown in the embodiments a portable thermal convection rotisserie and barbeque apparatus which enables selected foods to be mounted on the elongated spit shaft using a plurality of spit forks at various heights. The encapsulated food within the hollow housing is then rotated at the same rate as the centrifugal fan at the top end. The apparatus may be controlled using a variety of fuel sources such as charcoal, wood, other flammable sources which may be stored within a rectangular grate (i.e., fuel basket) attached to a removable portion of the back end. The centrifugal fan and internal temperature are regulated by the flow of air which enters the housing through a set of sliding doors at the front side and which exit between each of the evenly spaced concave blades of the centrifugal fan.

Traditional rotisserie or barbeque systems use an integrated motor which acts to rotate the spit shaft at a predetermined rate until the encapsulated food is cooked to a desired temperature. These traditional designs are limited in their portability and use due to their dependence on an electrical source. The current apparatus utilizes convection cooking to rotate the centrifugal fan and cook the food faster with a more uniform internal temperature wherein the air flow through the centrifugal fan controls the rotational rate of the spit shaft.

Figure 1:
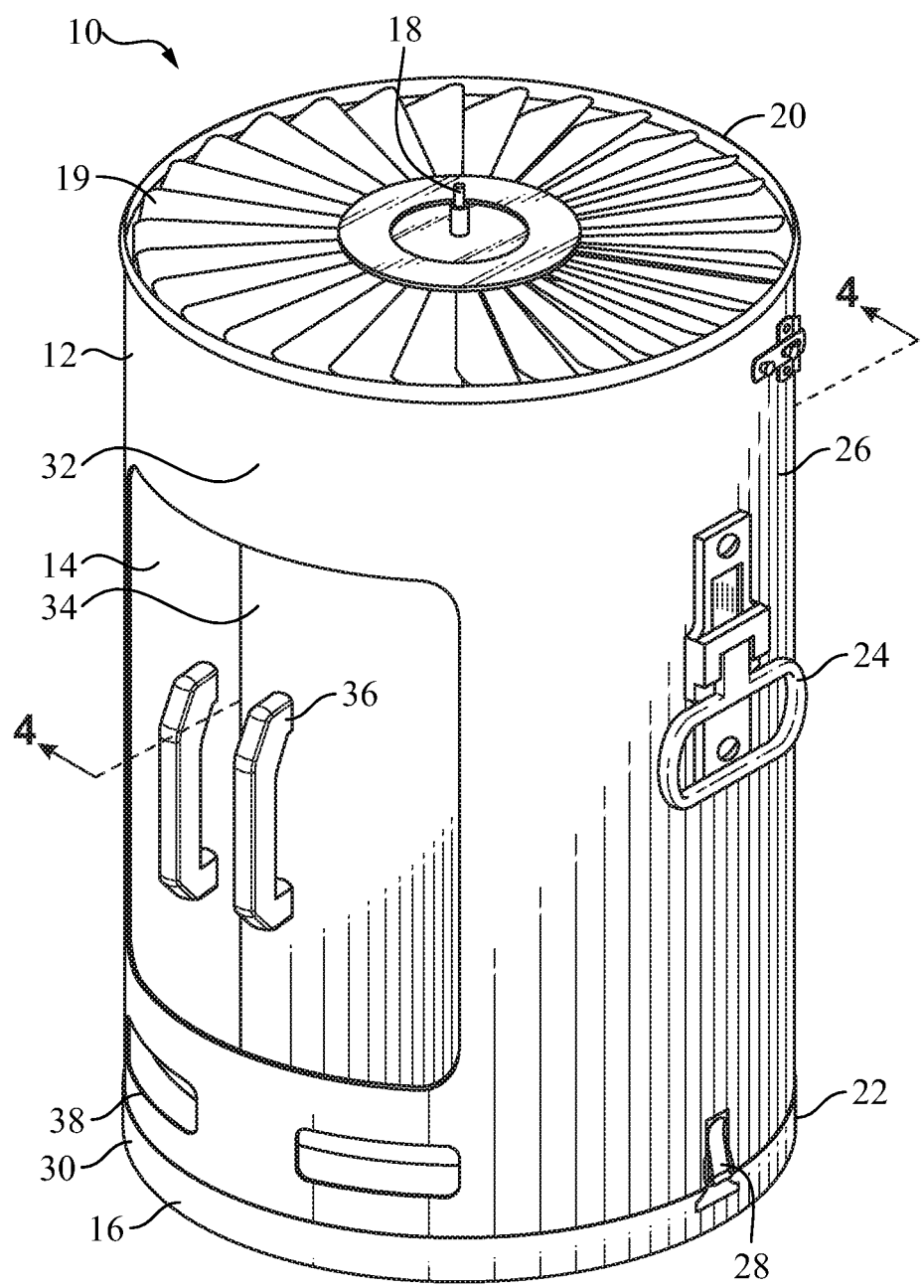
FIG. 1. is a perspective view of a portable thermal convection rotisserie and barbeque apparatus.

Referring now to the drawings wherein like reference numerals designate identical or corresponding parts throughout the views, there is shown in FIG. 1 a portable thermal convection rotisserie and barbeque apparatus 10 which may be used in a variety of commercial and residential settings. The apparatus 10 includes a housing 12 having a hollow internal region 14 which enables selectively encapsulated food to be cooked using natural convection airflow which allows the food to be cooked approximately 25% faster than traditional rotisserie and barbeque systems. The air flow through the internal region 14 allows the outside of the meat to be cooked using convection while the interior is cooked using conduction. The apparatus includes a removable bottom drip pan 16, elongated spit 18, and centrifugal fan 19 at the top side 20.

The housing 12 is cylindrically-shaped including having a hollow top side 20 and bottom side 22. The housing 12 further includes a set of carrying handles 24 which are mounted opposite one another along a mid-portion of the housing 26. The housing further includes a set of securing fasteners 28 affixed along a bottom portion of housing 30 which allows the removable bottom drip pan 16 to be secured during use and removed for washing.

Along the front side of the housing 32 is a set of front doors 34 recessed within the housing 12 and further including a set of handles 36 located on each of the front doors which allow the user to slide the doors between an open and closed position and provide access to the internal region of the housing 14. The set of front doors 34 control the primary air flow to the heat source and centrifugal fan 19. If too much air is received, there will be a loss of heat and excessive fuel burn resulting is a loss of efficiency. Further located on the front side of the housing 32 just below the set of front doors 34 is the substantially elongated vent panels 38 which control air flow the internal region of the housing 14. Similar to a traditional stove design, air flow to the apparatus 10 is the key ingredient to efficiency. As illustrated in FIG. 1 the elongated vent panels 38 are located below the fuel source of the apparatus 10.

Similar to any convection cooking, the heat received from fuel sources enables thousands of vibrating air molecules which transfer the heat energy to the meat mounted on the elongated spit 18. These highly excited and heated air molecules attached along the surface of the meat slowly transfer their thermal energy towards the center of the encapsulated food. It is contemplated the housing 12 and bottom drip pan 16 are comprised of a stainless steel material with thermal conductivity between 7 and 26 Btu/(hr ° F. ft); however, any suitable heat resistant metal which facilitates thermal convection may be used.

Figure 2:
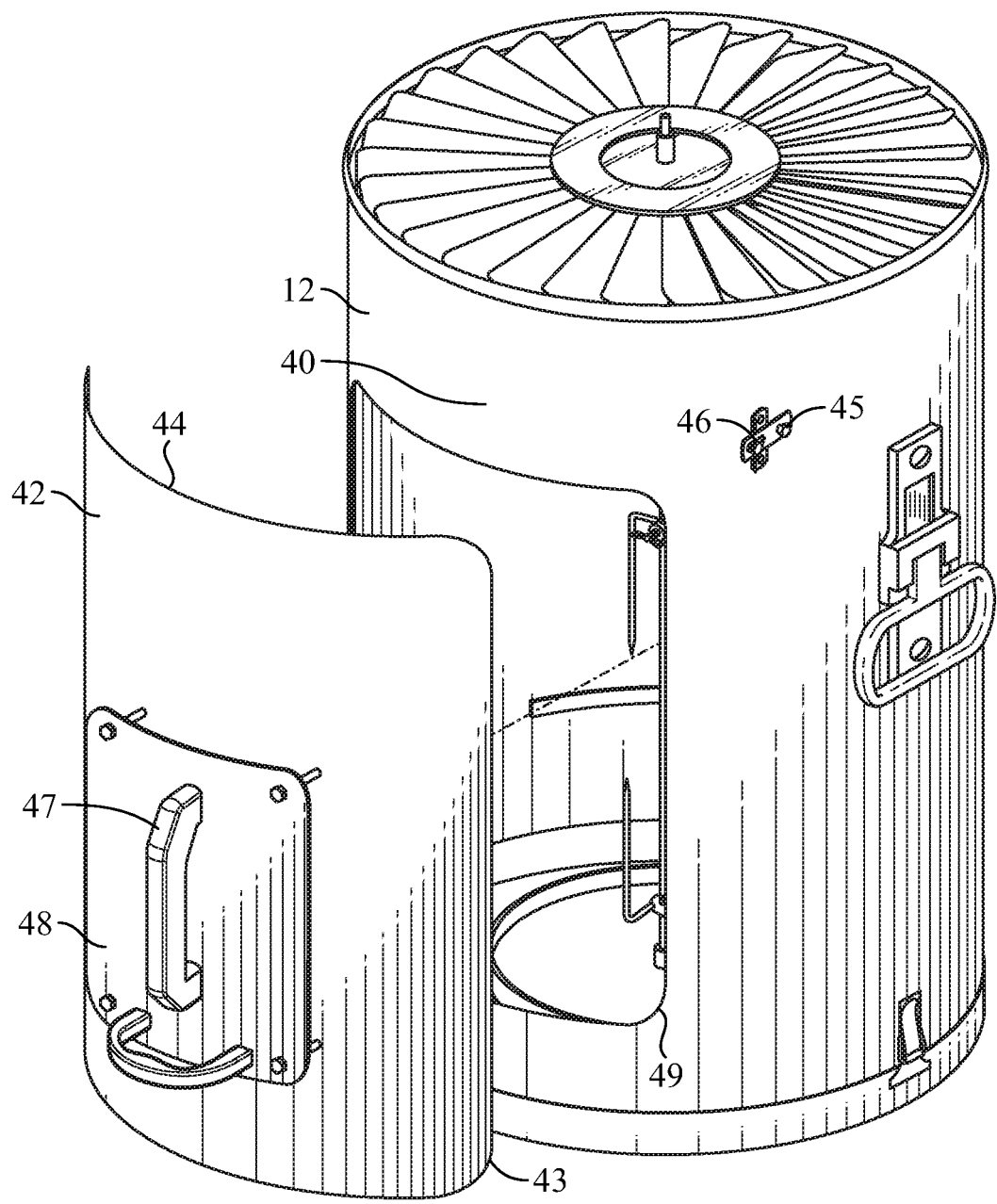
FIG. 2 is view of the apparatus with the fuel basket panel removed from the back side.

Shown in FIG. 2 is a view of the back side of the apparatus 40 with the rear charcoal panel 42 removed to enable access the fuel basket (i.e., crate) 43 along the inside surface of the housing 44. In preparation for a barbeque, the user may first slide the securing latches 45 located on the back side of the apparatus to an unlocked position 46. The user may then pull on the rear grip 47 attached to the heat shield 48 to remove the rear fuel basket panel 42 recessed within the housing 12. The user may then add charcoal or wood within the rectangular shaped fuel basket 43 which may be pre-soaked with water or lighter fluid. When complete the user may then return the rear charcoal panel 43 within a recessed portion of the housing 49 and slide the securing latch 45 to the secured position.

Figure 3:
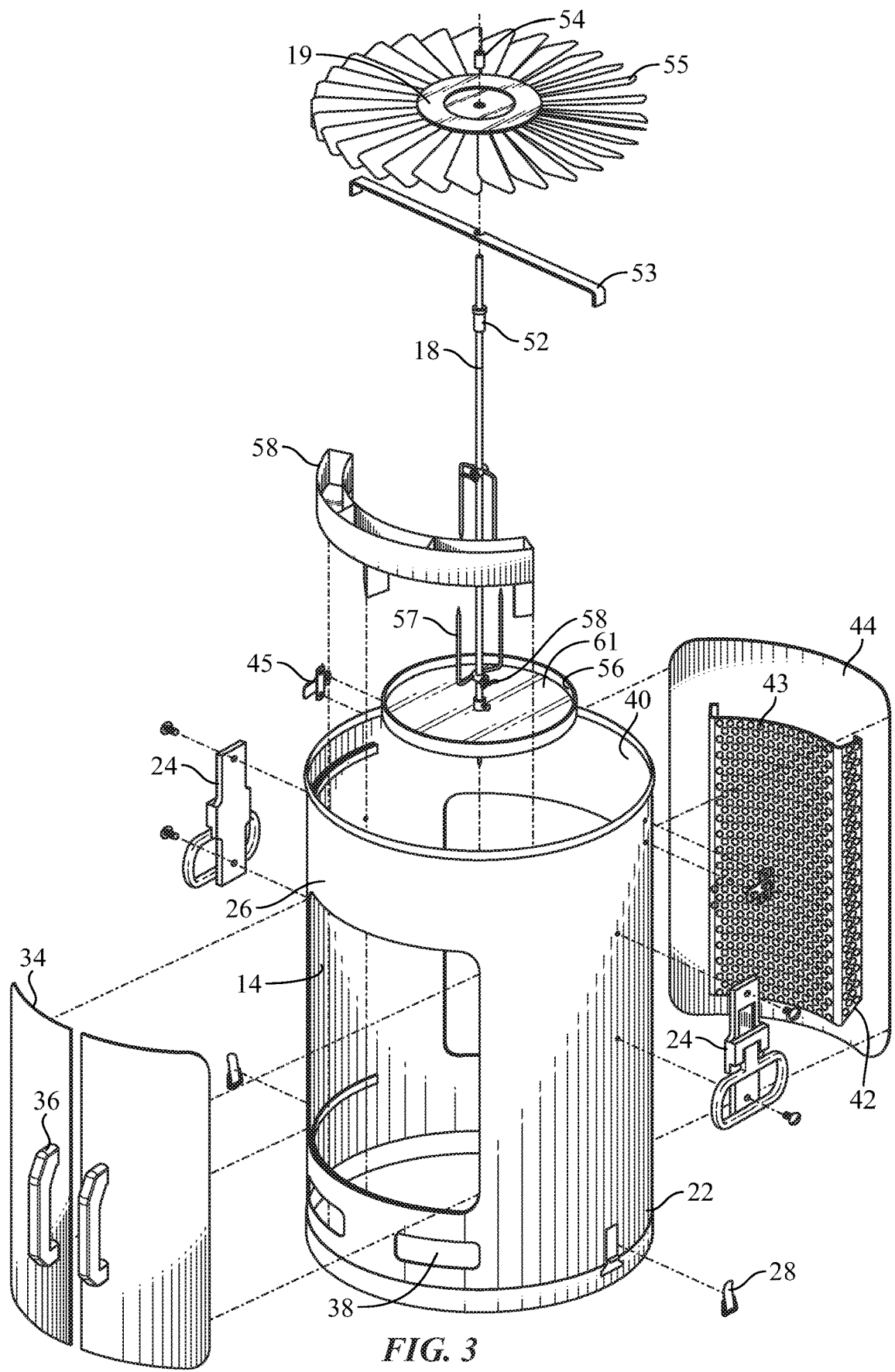
FIG. 3 is an exploded view of the apparatus.

Shown in FIG. 3 is an exploded view of the apparatus 10 including the spit shaft 18 which includes a top end 50 and bottom end 51. The top end of the spit shaft 18 includes a shaft seat 52, fan base beam 53, and securing nut 54. When fully assembled the centrifugal fan 19 is placed on and over the shaft seat 52 and fan base beam 53 which restrict any vertical movement of the spit shaft 18 while rotating. To further secure the centrifugal fan 19 about the spit shaft 18 is the securing nut 54.

Further illustrated on the centrifugal fan 19 is the plurality of concave blades 55 which control the air flow using the concave pitch design of each blade which enables a high volume air flow to rotate the spit shaft 18. The rotational speed of the centrifugal fan is proportional to the air regulated into the internal region 14 using the vent panels 38 and set of front doors 34. As with any grilling, air flow to the heat source and fuel is critical. When warming up the apparatus 10 for cooking, the front doors 34 are placed in a completely open position to allow as much intake oxygen to the fuel source until a desired temperature is achieved. Once heated to a desired temperature and the apparatus 10 is ready for cooking, the set of front doors 34 is transitioned to a partially closed position to suppress the intake air flow. The vent panels 38 are located below the bottom portion of the removable rectangular shaped fuel basket 62 and provide air flow to the bottom of the fuel source. Further located at the bottom end of spit shaft 51 is circular-shaped collecting (i.e., containment) pan 61 having a uniform sidewall 56 to capture any external juices dripping from the encapsulated food.

The spit shaft 18 is further designed to allow a plurality of spit forks 57 to be positioned and rotated about the spit shaft to a desired height. The spit forks 57 include a locking clamp 58 that can move up/down along the spit shaft 18 and be locked into place by twisting the locking clamp when a desired height is achieved. Further shown in FIG. 3 is a wood chip basket designed to be seated within the hollow internal region 14 at the front side of housing 32 to provide a smoky wood flavor the encapsulated food.

Figure 4:
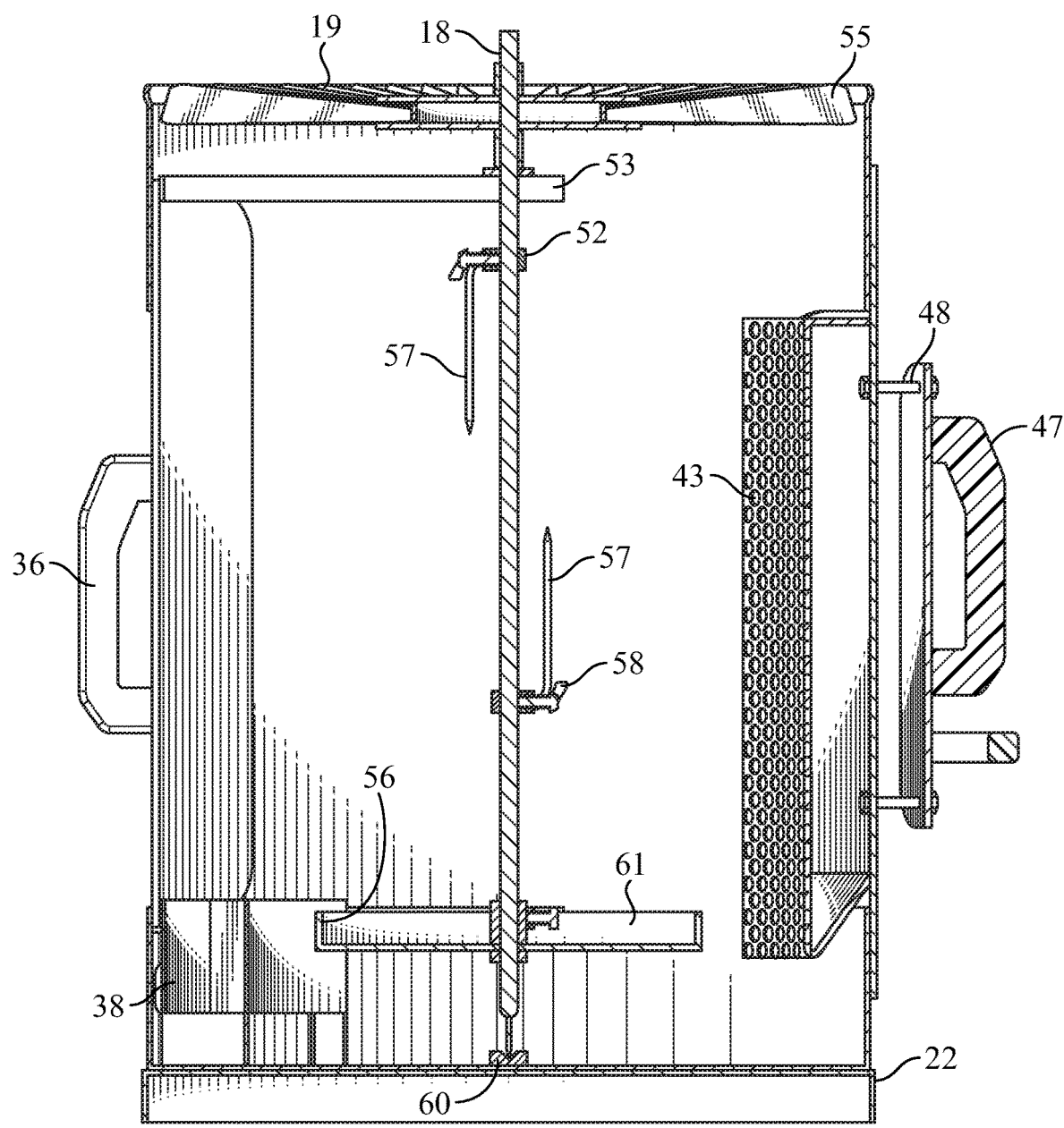
FIG. 4 is a cross-sectional view of the apparatus including the plurality of integrated components.

Shown in FIG. 4 is a cross-sectional view of the apparatus 10 including the spiked bottom end of the spit shaft 51 placed with the spit shaft anchor 60 attached to the bottom drip pan 16. After use, the apparatus 10 may be disassembled by first removing the securing nut 54 at the top end of the spit shaft 50 and to access the centrifugal fan 19 and fan base beam 53. The user may then unseat the spit shaft 18 from the spit shaft anchor 60. If the coals contained within the fuel basket 43 are still hot, the user may elect to remove the drip pan 16 by un-securing each of the set of securing fasteners 28 and discarding any residue collected. Once the coals have reached a safe temperature, the user may place the securing latches 45 in an unlocked position 46 to access the fuel basket 43.

It will be appreciated by persons skilled in the art that the present embodiment is not limited to what has been particularly shown and described hereinabove. In addition, unless mention was made above to the contrary, it should be noted that all of the accompanying drawings are not to scale. A variety of modifications and variations are possible in light of the above teachings without departing from the following claims.

What is claimed is:

1. A portable barbeque and rotisserie apparatus which enables thermal convection cooking, the apparatus comprising:
    a cylindrically-shaped housing having a front side and a back side and configured to cook an encapsulated food through thermal convection; the front side including a set of sliding doors to provide access to the encapsulated food by sliding between an open and closed position, and a back side including a releasable rear panel to provide access to an interior fuel basket;
    a spit shaft extending a length of the housing and configured to mount an encapsulated food using a plurality of spit forks positionable along an axis of the spit shaft; and
    a centrifugal fan releasably attached to a top end of the spit shaft and contained within an interior top end of the housing and configured to rotate the spit shaft at a variety of speeds using a controlled air source.

2. The apparatus of claim 1, wherein the housing further includes a hollow top end dimensioned to enable the centrifugal fan to be inserted into the interior top end.

3. The apparatus of claim 2, wherein the housing further includes a substantially planar drip pan at a bottom end and releasably attached to the bottom end of the housing using a set of securing fasteners.

4. The apparatus of claim 3, wherein the housing further includes a set of vent panels configured to control an air flow to the encapsulated food.

5. The apparatus of claim 4, wherein the housing further includes a set of securing latches configured to secure/unsecure the rear panel in a recessed portion of the housing.

6. The apparatus of claim 5, wherein the rear panel includes a heat shield anchored to an exterior portion of the rear panel.

7. The apparatus of claim 6, wherein heat shield includes a grip.

8. The apparatus of claim 1, wherein the spit shaft includes a circular-shaped containment pan at a second end of the shaft to capture a dripping from the encapsulated food.

9. The apparatus of claim 1, wherein a second end of the spit shaft is comprised of a tungsten steel metal to enable smooth rotation within a spit shaft anchor.

10. A portable barbeque and rotisserie apparatus which enables thermal convection cooking, the apparatus comprising:
    a cylindrically-shaped housing which enables thermal convection to an encapsulated food and having a front side and a back side; the front side including a set of sliding doors contained within a recessed interior portion of the housing, each of the set of sliding doors including a handle to provide access to the encapsulated food by sliding between an open and closed position, and a back side including a removable rectangular shaped fuel basket housed within a recessed portion of an internal backside of the housing and configured to provide a containing means for a selected fuel source;
    a spit shaft extending a length of the housing and configured to mount an encapsulated food using a plurality of spit forks positionable along an axis of the spit shaft; and
    a centrifugal fan releasably attached to a top end of the spit shaft and contained within an interior top end of the housing and configured to rotate the spit shaft at a variety of speeds using a controlled air source.

11. The apparatus of claim 10 wherein the housing further includes a set of carrying handles affixed opposite one another along an exterior portion of the housing.

12. The apparatus of claim 10 wherein the front end of the housing further includes a set of elongated vent panels configured to control an air intake to the hollow interior portion of the housing.

13. The apparatus of claim 12 wherein the interior portion of the housing further includes a removable wood chip storage means.

14. The apparatus of claim 10 wherein the rear panel is secured within an interior recessed portion using a set of securing fasteners along an exterior portion of the housing.

15. The apparatus of claim 10 wherein the plurality of spit shaft forks include a locking mechanism to releasably secure the spit shaft fork at a desired height along the spit shaft.

16. A portable barbeque and rotisserie apparatus which enables thermal convection cooking to an encapsulated food source, the apparatus comprising:
    a cylindrically-shaped housing including:
        a front end having a set of sliding doors contained within an interior track and controlled using a set of affixed handles;
        a back end including a removable rectangular shaped fuel basket affixed to a rectangular shaped heat shield to enable a selected fuel source to be filled/removed;
        a open top surface to enable a discharged airflow to exit the apparatus;
        a bottom end including a substantially planar base releasably affixed to an exterior portion of the housing to discharge a collected residue from the encapsulated food;
    a spit shaft extending a length of the housing along an axis of the housing having a first and a second end; the first end dimensioned to fit a centrifugal fan having a plurality of concave pitched blades, and a second end comprised of a tungsten steel material having a spiked portion and configured to rotate within a spit shaft anchor, and configured to releasably secure a plurality of spit forks at a desired height; and
    a centrifugal fan releasably attached to a top end of the spit shaft and contained within an interior top end of the housing and configured to rotate the spit shaft at a variety of speeds using a controlled air source.

17. The apparatus of claim 16 wherein the front end further includes a set of vent panels configured to provide an outside air flow to at least a bottom portion of the removable rectangular shaped fuel basket.

\* \* \* \* \*